Dec. 14, 1948.  J. S. KAMPER  2,456,285
CONCRETE FEED AND FERTILIZER MIXER
Filed July 10, 1947  2 Sheets-Sheet 1
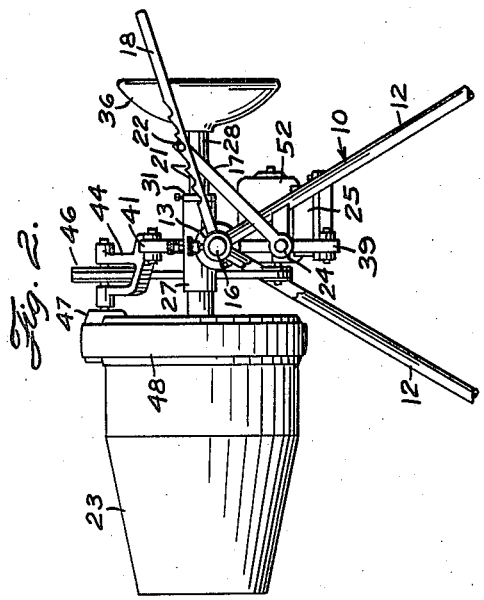
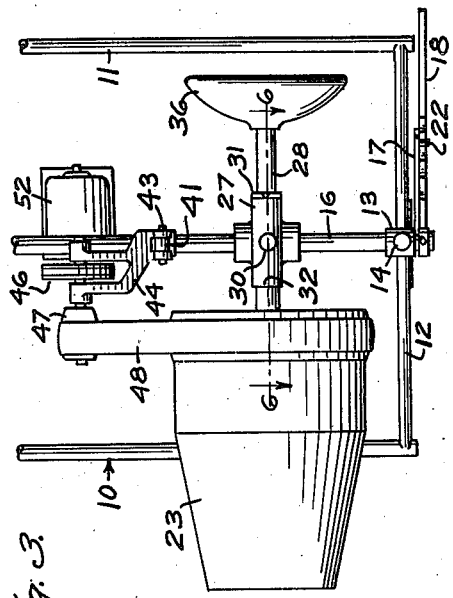
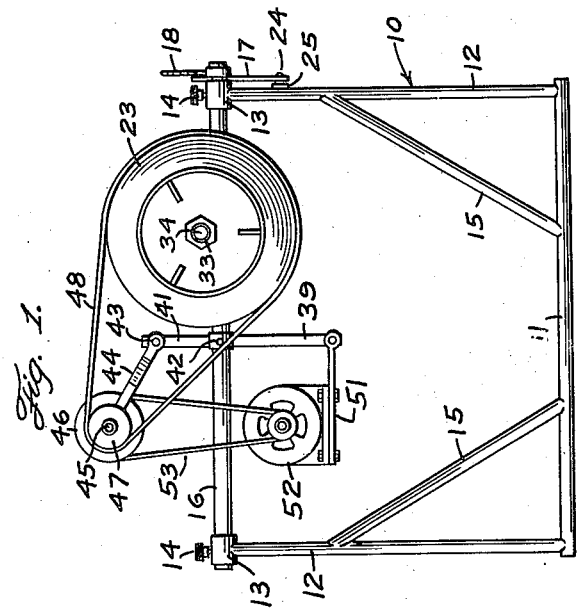
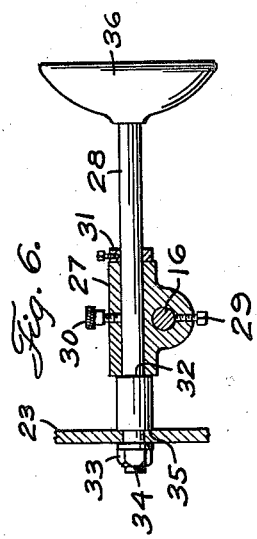
INVENTOR.
JOHN S. KAMPER
BY Victor J. Evans & Co.
ATTORNEYS Dec. 14, 1948.                J. S. KAMPER                    2,456,285
                    CONCRETE FEED AND FERTILIZER MIXER
Filed July 10, 1947                                      2 Sheets-Sheet 2
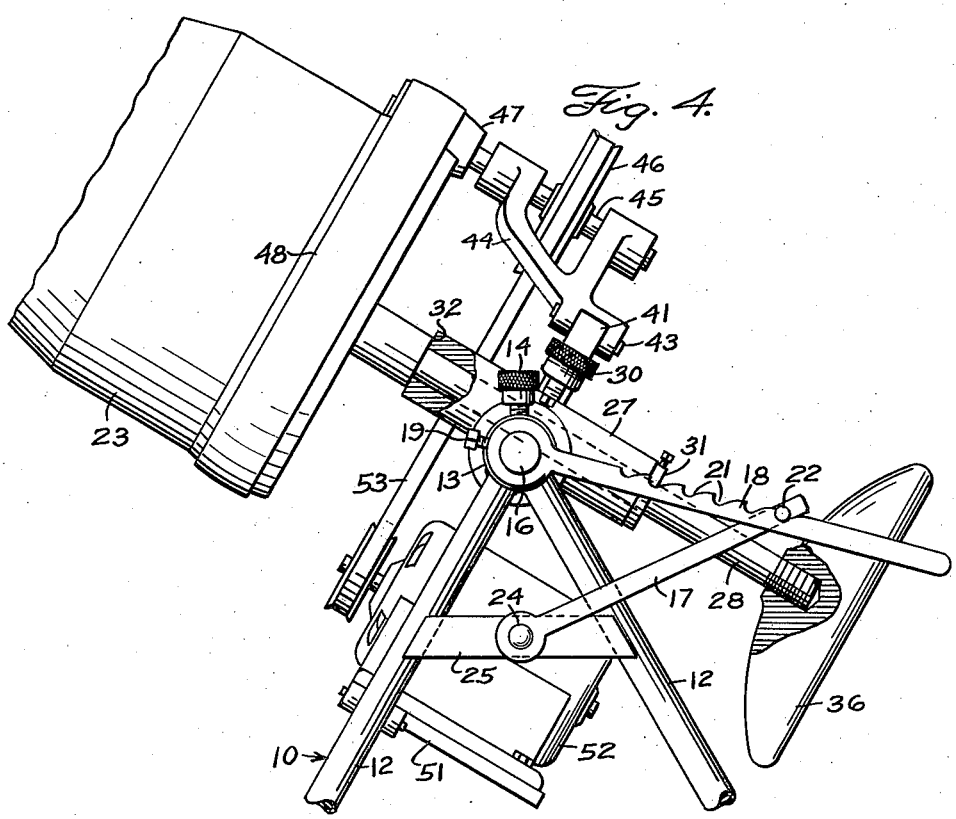
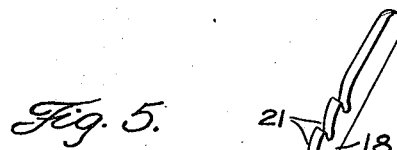
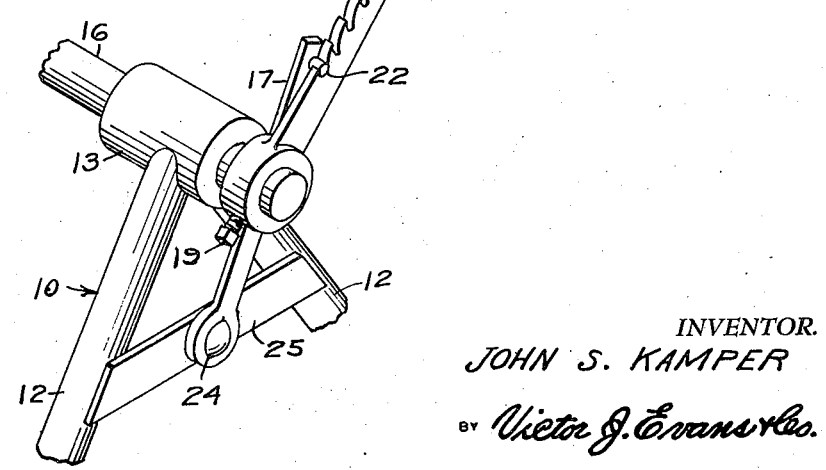
INVENTOR.
JOHN S. KAMPER
BY *Victor J. Evans & Co.*
ATTORNEYS Patented Dec. 14, 1948

2,456,285

UNITED STATES PATENT OFFICE 2,456,285

CONCRETE FEED AND FERTILIZER MIXER

John S. Kamper, Demopolis, Ala.

Application July 10, 1947, Serial No. 759,955

1 Claim. (Cl. 259—177)

This invention relates to a concrete, feed or fertilizer mixer.

It is an object of the present invention to provide a mixer for concrete, feed or fertilizer which is easy to handle and manipulate for the purpose of dumping the contents of the same and wherein there is provided a simple means for the maintaining of the belts used for driving the conveyor always tight so that there is little slippage between the parts and the belt.

It is another object of the present invention to provide in a mixer device, a counterweight on a rearwardly extending extension which will assist the operator in returning the mixer from its discharge position to a horizontal position and further for simple means of retaining the mixer in the horizontal position.

For other objects and for a better understanding of the invention, reference may be had to the following detailed description taken in connection with the accompanying drawing, in which Fig. 1 is a front elevational view of my mixer looking into the discharge end thereof.

Fig. 2 is a fragmentary side elevational view of my mixer.

Fig. 3 is a fragmentary top plan view of my mixer.

Fig. 4 is an enlarged fragmentary and side elevational view of my mixer elevated to a position raised from the horizontal.

Fig. 5 is an enlarged fragmentary and perspective view of the means for retaining the mixer in the raised position.

Fig. 6 is a longitudinal cross-sectional view taken on line 6—6 of Fig. 3.

Referring now to the figures, 10 represents a frame construction for supporting the parts of the mixer. This frame comprises a bottom piece 11 and vertically extending pieces 12 having bearing sleeves 13 thereon with grease cups 14 for lubricating the same. Braces 15 connect the bottom pieces 11 with the upright pieces 12.

Through the bearing sleeves 13 there is extended a shaft 16 which can be rotated and retained in an adjusted position by the connection of a link 17 with an arm 18 fixed by a set screw 19 on the shaft 16 and serving as a handle by means of which the shaft 16 and the parts thereon can be rotated or tilted. The handle 18 has a plurality of notches 21 into which a pin 22 of the member 17 can be inserted depending upon the position of mixer chamber 23 which is desired. The lower end of the member 13 is pivoted as indicated at 24 to a transverse piece 25 on the upright or leg portions 12 of the frame.

On the shaft 16, there is mounted a supporting block 27 through which is extended a shaft 28. The block is fixed to the shaft 16 by a set screw 29. An oil cup 30 supplies oil to the shaft 28. The shaft 28 is rotatable in the supporting block 27 and is fixed against axial displacement by a set collar 31 and a shoulder portion 32. The mixer is fixed upon the shaft 28 by a nut 33 tightened upon a threaded portion 34 to retain mixer element 23 against a shoulder 35. On the opposite end of the shaft 26 is a counterweight 36 adapted to assist the operator in returning the mixer element 23 to its horizontal position or to a position raised therefrom after it has been tilted downwardly for the discharge of its contents.

Also on the shaft 16 to be rotated therewith is fixed a member having depending arm 39 and an outwardly extending arm 41. The member is fixed to the shaft 16 to rotate therewith by a set screw 42. On the upper arm there is pivoted as indicated at 43 an arm 44 in which a shaft 45 with pulleys 46 and 47 thereon. A belt 48 extends from pulley 47 over mixer element 23 to rotate the same.

On the arm 39 there is pivoted a mounting bracket 51 for supporting an electric motor 52. A belt 53 connects the motor pulley with the pulley 46. The weight of the motor will keep belt 53 tight and at the same time will cause arm 44 to be pivoted downwardly from upwardly inclined positions so as to tighten belt 48 upon the mixer element 23, thereby to keep all belts tight and to prevent their slippage over their operating surfaces. Inasmuch as the member having the arms 39 and 41 is fixed with the shaft 16, the parts including the motor connected therewith will be rotated or tilted as the mixer element is tilted to either a discharge position or to a raised and operating position.

While various changes may be made in the detail construction, it shall be understood that such changes shall be within the spirit and scope of the present invention as defined by the appended claim.

I claim:

A mixing device comprising a frame, a shaft journalled on the frame, a mixing element, means for connecting the mixing element to the shaft to be adjusted therewith, means for adjusting the shaft to move the mixing element between discharge and raised positions, electric motor drive means including belts and belt pulleys connected to the shaft to be tilted therewith, said motor means including a member having a portion extending upwardly from the shaft and a portion extending downwardly therefrom, said member being fixed to the shaft, an arm pivoted upon the upwardly extending portion and normally retained in an upwardly inclined position, a shaft with two pulley wheels thereon, a pulley belt extended between one of the pulley wheels on the arm and the mixing element to rotate the same, a mounting base for the electric motor pivoted to the lower arm of the member, a pulley belt extended between the electric motor and the other pulley of the shaft of the arm, said electric motor utilizing its weight to tighten the belt between the motor and the pulley on the pivoted arm and whereby to pull the arm downwardly so as to tighten the belt between its pulley wheel on the arm and the mixing element.

JOHN S. KAMPER.

REFERENCES CITED

The following references are of record in the file of this patent:

UNITED STATES PATENTS

| Number | Name | Date |
| --- | --- | --- |
| 1,453,323 | Palmeter | May 1, 1923 |
| 2,176,874 | St. John | Oct. 24, 1939 |

FOREIGN PATENTS

| Number | Country | Date |
| --- | --- | --- |
| 118,510 | Australia | May 25, 1944 |